US006694328B1

(12) United States Patent
Bennett

(10) Patent No.: US 6,694,328 B1
(45) Date of Patent: Feb. 17, 2004

(54) METHOD FOR CREATING QUERIES ON VERSION OBJECTS

(75) Inventor: Brian T. Bennett, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,020

(22) Filed: Jan. 13, 2000

(51) Int. Cl.[7] .................................................. G06F 7/00
(52) U.S. Cl. ........................ 707/103 R; 707/3; 707/10; 707/102; 707/104.1
(58) Field of Search ............................. 707/1–10, 100, 707/102, 103, 104.1; 705/1

(56) References Cited

U.S. PATENT DOCUMENTS

| | | | | |
|---|---|---|---|---|
| 5,220,625 A | * | 6/1993 | Hatakeyama et al. | 345/809 |
| 5,287,496 A | * | 2/1994 | Chen et al. | 707/203 |
| 5,313,629 A | * | 5/1994 | Abraham et al. | 707/103 R |
| 5,377,350 A | * | 12/1994 | Skinner | 709/316 |
| 5,437,027 A | * | 7/1995 | Bannon et al. | 707/103 R |
| 5,488,721 A | * | 1/1996 | Rich et al. | 707/103 R |
| 5,499,365 A | * | 3/1996 | Anderson et al. | 707/203 |
| 5,504,885 A | * | 4/1996 | Alashqur | 717/141 |
| 5,535,389 A | * | 7/1996 | Elder et al. | 717/170 |
| 5,548,755 A | * | 8/1996 | Leung et al. | 707/2 |
| 5,724,570 A | * | 3/1998 | Zeller et al. | 707/3 |
| 5,734,887 A | * | 3/1998 | Kingberg et al. | 707/4 |
| 5,761,493 A | * | 6/1998 | Blakeley et al. | 707/4 |
| 5,765,147 A | * | 6/1998 | Mattos et al. | 707/4 |
| 5,797,136 A | * | 8/1998 | Boyer et al. | 707/2 |
| 5,899,997 A | * | 5/1999 | Ellacott | 707/103 R |
| 5,924,103 A | * | 7/1999 | Ahmed et al. | 707/201 |
| 5,930,700 A | * | 7/1999 | Linenbach et al. | 707/100 |
| 6,061,721 A | * | 5/2000 | Ismael et al. | 709/223 |
| 6,122,645 A | * | 9/2000 | Bohannon et al. | 707/203 |
| 6,134,559 A | * | 10/2000 | Brumme et al. | 707/103 R |
| 6,138,112 A | * | 10/2000 | Slutz | 707/2 |
| 6,169,993 B1 | * | 1/2001 | Shutt et al. | 707/103 R |
| 6,236,999 B1 | * | 5/2001 | Jacobs et al. | 707/10 |
| 6,237,135 B1 | * | 5/2001 | Timbol | 717/107 |
| 6,256,773 B1 | * | 7/2001 | Bowman-Amuah | 717/121 |
| 6,275,863 B1 | * | 8/2001 | Leff et al. | 709/248 |
| 6,298,478 B1 | * | 10/2001 | Nally et al. | 717/170 |
| 6,308,179 B1 | * | 10/2001 | Petersen et al. | 707/102 |
| 6,374,252 B1 | * | 4/2002 | Althoff et al. | 707/102 |
| 6,499,036 B1 | * | 12/2002 | Gurevich | 707/103 R |
| 6,578,073 B1 | * | 6/2003 | Starnes et al. | 709/228 |
| 6,591,272 B1 | * | 7/2003 | Williams | 707/102 |
| 6,597,366 B1 | * | 7/2003 | Bennett et al. | 345/619 |

OTHER PUBLICATIONS

"A Distributed Object Oriented Framework to Offer Transactional Support for Long Running Business Processes"—Brian Bennett, Bill Hahm, Avraham Leff, Thomas Mikalsen, Kevin Rasmus, James Rayfield and Isabelle Rouvellon—IFIP/ACM 4/200 (pp.: 331–348).*

* cited by examiner

*Primary Examiner*—Shahid Alam
*Assistant Examiner*—Anh Ly
(74) *Attorney, Agent, or Firm*—Ohlandt, Greeley, Ruggiero & Perle, L.L.P.; Gail H. Zarick

(57) ABSTRACT

A method is disclosed for performing a query in a Long Running Business Process framework system. The method has steps of: (a) generating a modified base search condition from a base search condition; (b) generating a facade search condition for specifying that a primary key be a primary key of a version object, from a visible version sub-query, that satisfies the generated modified base query; and (c) determining a unit of work context, and requesting all facades that satisfy the generated facade search condition. The step of generating a modified base search condition from a base search condition includes a step of replacing names representing base objects, for which version and facade objects will be made, with a corresponding visible version sub-query.

16 Claims, 6 Drawing Sheets

METHOD FOR CREATING QUERIES ON VERSION OBJECTS

FIELD OF THE INVENTION

This invention relates in general to techniques for generating data base queries and, more particularly, to techniques for generating queries in long running business processes. Even more particularly, the teachings of this invention pertain to generating queries when long running business processes are structured hierarchically and operate on versions of base objects of an application. This invention creates queries for version objects from the queries for the base objects.

BACKGROUND OF THE INVENTION

Many business processes, such as mortgage application processing and insurance policy underwriting, typically comprise other, smaller processes such as entering information about the applicant, calculating monthly payments etc., which may themselves have sub-processes. As such, these processes and sub-processes form a hierarchy. Such processes can run for several days to a month or even longer. As such, the intermediate results of these processes must be persistent.

These and other business processes typically deal with real world entities such as mortgage application processing, insurance policy underwriting, persons, automobiles, etc.

In a computer handling these processes these real world entities are preferably implemented as objects, and the persistent data corresponding to these objects is preferably managed in a relational data base or an object data base.

Most data base systems are "update in place", i.e., only the current data values are maintained in the data base. Typically, these data bases implement single level transactions with so-called Atomic, Consistency, Isolated, Durable (ACID) properties. While the small leaf processes of a business process hierarchy may be suitable for implementation as single level transactions, the larger non-leaf business processes cannot normally be implemented as transactions because of lock contention (data locked for read and write). It is typically not feasible to attempt ACID transactions which have any significant duration. In fact, this becomes feasible only when the nature of the application is such that there is very little lock contention.

To satisfy the requirements of long running business processes which consist of a hierarchy of smaller business processes, and whose intermediate results must be persistent, a Long Running Business Process framework that uses object versions can be constructed. In such a framework the client application deals with two types of object: the unit of work (uow) object which represents a nested long running transaction (provided by the Long Running Business Process framework), and base objects such as an insurance policy that the application writer can relate to. A client application will typically "join" a unit of work to establish a unit of work context, make method invocations on the base objects, and then "commit" or "roll back" the unit or work. However, for each base object the Long Running Business Process framework maintains a facade object to represent the base object and version objects, each having as a version identification (id) attribute, the id of the unit of work (uowid) in which it was created.

When a client application makes method invocations on a base object under a given unit of work context, the Long Running Business Process framework maps the method invocations onto the version object visible to that unit of work. The version object visible to a particular unit of work is the version object having a version id that is equal to the id of that unit of work, if such a version object exists, else it is the version object with a version id equal to the id of the parent unit of work or, again, if the parent unit of work does not exist not, the grandparent unit of work, etc. New version objects with version id equal to the current unit of work id are created by copying the version object with the parent unit of work id when an object is modified or, if desired, on a first reference to the object. When the unit of work "commits", its version is made available to the parent unit of work.

This approach has several advantages. For example, concurrent updates are permitted as long as there is a mechanism in place to resolve most conflicts. Commonly assigned U.S. patent application Ser. No. 09/236,532, filed Jan. 25,1999, "System and Method for Programming and Executing Long Running Transactions", by A. Leff, F. Parr and J. Rayfield, describes an application-independent technique for resolving conflicts. In other cases application-dependent conflict resolution can be programmed. Also, when the results of processes need to be removed because the process failed, or otherwise needs to be rolled back, then their changes can be removed by removing their versions rather than compensating for their modifications.

Since most business processes involve queries there is a need for the Long Running Business Process framework to support them. In one Long Running Business Process framework known to the inventor queries are written in the client applications. In that case the queries are manually translated into queries expressed in terms of version objects. In another Long Running Business Process framework that is known to the inventor the queries are programmed in the server as finder methods which a client application can invoke.

In either case it would highly desirable to hide from the user the complexity of facade and version objects, by having the programmer specify the query in terms of the base objects, and then letting the system deal with the additional complexity. Thus, it can be appreciated that there is a need for a method for performing queries in a Long Running Business Process Framework system that exhibits this and other desirable traits.

OBJECTS AND ADVANTAGES OF THE INVENTION

It is a first object and advantage of this invention to provide a method for performing queries in a Long Running Business Process Framework system.

It is another object and advantage of this invention to shield the user from the complexity of facade and version objects, by providing a capability to express a query in terms of base objects.

SUMMARY OF THE INVENTION

The foregoing and other problems are overcome and the objects of the invention are realized by methods and apparatus in accordance with embodiments of this invention.

This invention teaches a method for performing queries in a Long Running Business Process Framework system. In a preferred embodiment the method takes as an input the base query, that is, the query expressed in terms of one or more base objects.

In general, the method determines the search condition of a query, if necessary, by parsing the query. The query for the version objects is constructed by defining a sub-set of versions that the issuer of the query should see, and applying the search condition to this sub-set of versions to determine the unique identifications (ids) of the objects satisfying the query. These unique ids are then used to select the objects in the result set of the query.

More particularly, the method includes a step of generating directly, or generating code to generate, a modified base search condition from a base search condition, that is, the search condition of the base query. This is accomplished by replacing names representing objects, for which version and facade objects will be made, with a corresponding visible version sub-query. The method further includes a step of generating directly, or generating code to generate, a facade search condition which specifies that a primary key be one of the primary keys of version objects from the visible version sub-query, that satisfy the modified base query. The method further includes a step of generating code to determine a unit of work context, and to request all facades that satisfy the facade search condition.

The step of generating the visible version sub-query for a class of objects may generate a sub-query which for each primary key determines the maximum length of the version id of all version object instances whose version id is that of the unit of work, or an ancestor unit of work, and a sub-query which selects the version object instances whose version id length is the maximum for that primary key.

Alternatively, the step of generating the visible version sub-query for a class of objects may generate a sub-query which selects versions having as a version id the unit of work id, or if none exist with that primary key, the parent unit of work id, or if neither of these exist, the grandparent unit of work id, etc.

The original and/or translated queries may be expressed in the Structured Query Language (SQL) or in the Object Oriented SQL (OOSQL).

The method may include a step of verifying that a base findxxx method, or that a base query, has an acceptable form.

The step of generating the query to request all facades satisfying the facade search condition may generate a query that associates names to sub-queries, and that then uses those names instead of the sub-queries in the body of the facade search condition.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
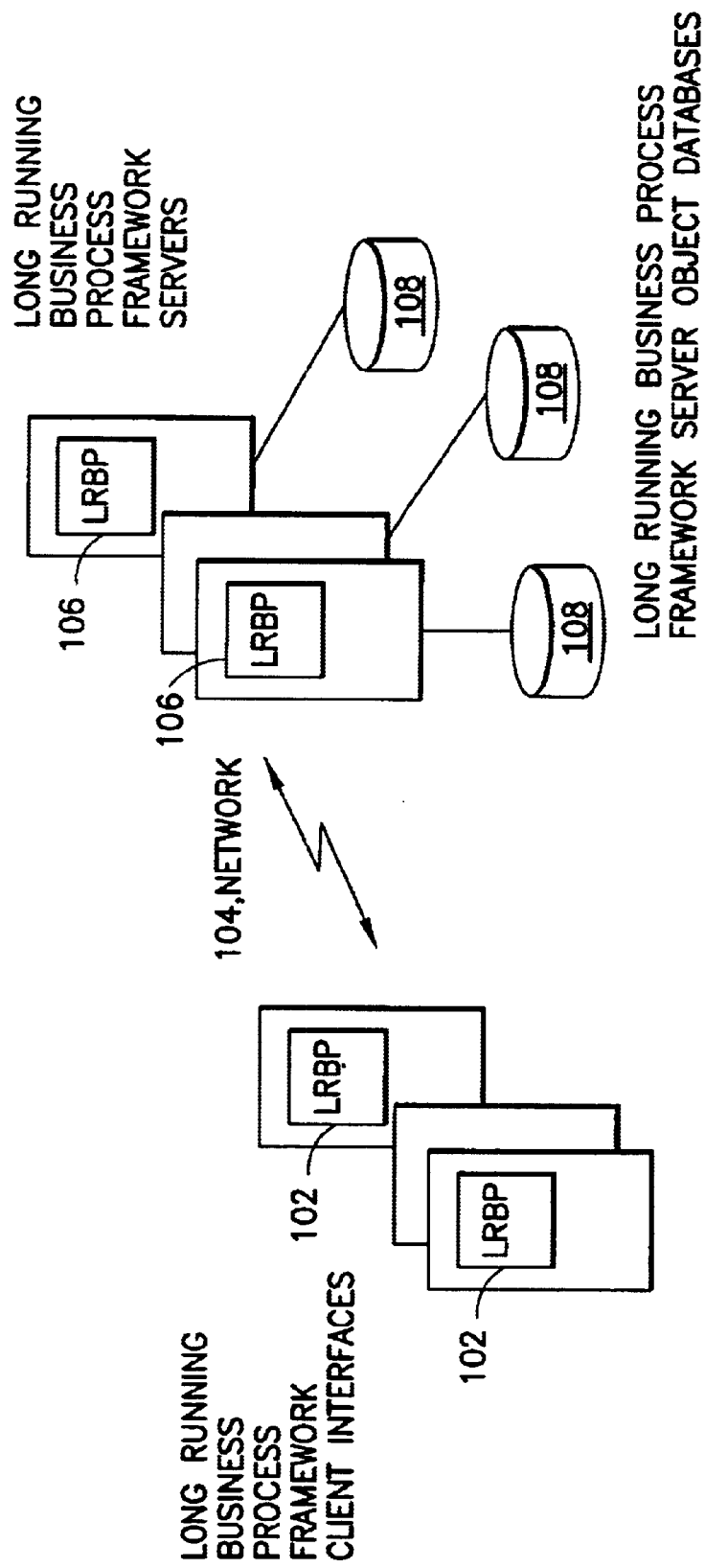
FIG. 1 is a simplified block diagram illustrating a system having Long Running Business Process Framework client interfaces connected over a network to Long Running Business Process Framework servers, and is a suitable embodiment of a system for practicing this invention.

This invention relates to queries in a Long Running Business Process Framework system for programming and executing long running business processes. The phase "long running" in this context typically implies days, weeks or months. FIG. 1 illustrates such a system having Long Running Business Process framework client interfaces 102 connected over a network 104 to Long Running Business Process framework servers 106. The servers 106 maintain their persistent data on Long Running Business Process framework server object databases 108.

This invention provides a technique whereby a Long Running Business Process framework client interface 102 can, as part of its processing, issue a query.

In some client/server distributed object systems the client application can formulate and have evaluated am arbitrary query. In such a system the client application code containing queries expressed in terms of base objects can be processed, before being used, to recognize the queries and replace them with equivalent queries expressed in terms of facades and version objects.

In the preferred embodiment of this invention, that of a Long Running Business Process framework which is based on a Sun Microsystem Enterprise JavaBeans™ component architecture (see Sun Microsystems Enterprise JavaBeans™), the base objects are Enterprise JavaBeans entity beans (EJBs) that have a persistent state, and that are container managed, i.e., the Enterprise JavaBeans Server system manages the persistent state of the EJBs. In an EJB system the client interfaces cannot request any arbitrary query. They can only invoke queries which have been predefined as finder methods on the home interface of the EJB. Thus, for the Long Running Business Process framework based on EJBs, the client application code is not changed for queries. Rather, it is the specification of the finder method on the server that is changed. These finder methods are requests for all objects of the class which satisfy a search condition.

Figure 2:
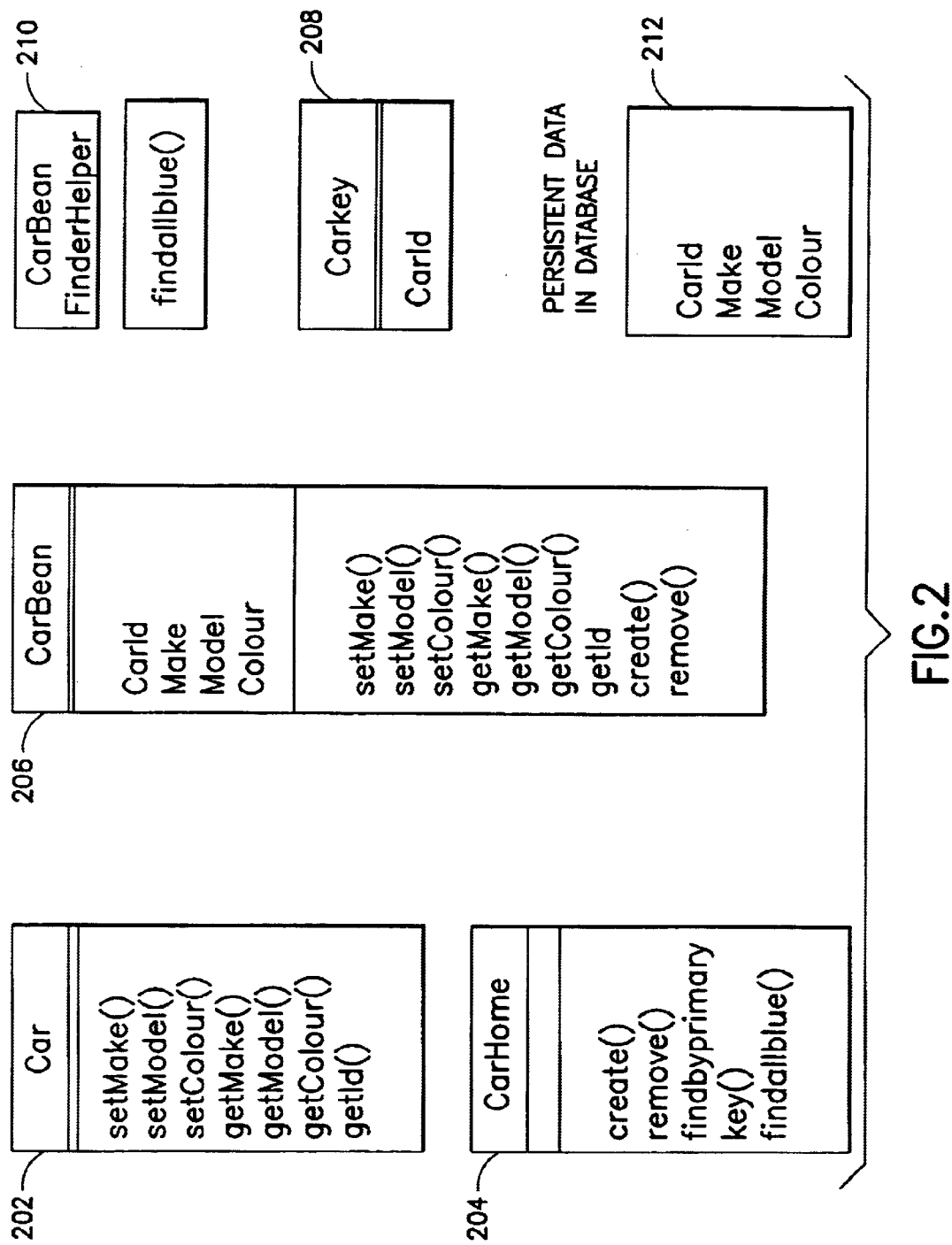
FIG. 2 illustrates, for an exemplary container-managed entity EJB, the Java classes needed to define the bean.

FIG. 2 illustrates for an exemplary car (automobile), container-managed entity EJB, the Java classes needed to define the bean. Class 202 is the remote interface to the car, it defines the methods that a client can call on the car object (getmake( ), setmake( ) etc., which allow the client application to respectively determine and change the make of a particular car instance stored in the database). Class 204 is a home interface for the car. Create, remove and find_by_primary_key are required methods whose implementation is largely provided by the container. Additional specialized finder methods (queries), such as find_all_blue, can be defined on this interface. Class 206 is an implementation class. It defines the data fields of the object and the implementations of the methods defined in the interfaces. Class 208 defines a key which uniquely defines each car instance. Class 210 defines an implementation each of finder methods (queries) defined in the home interface, except for find by_primary_key( ). Box 212 lists the persistent data fields of a car instance.

Figure 3:
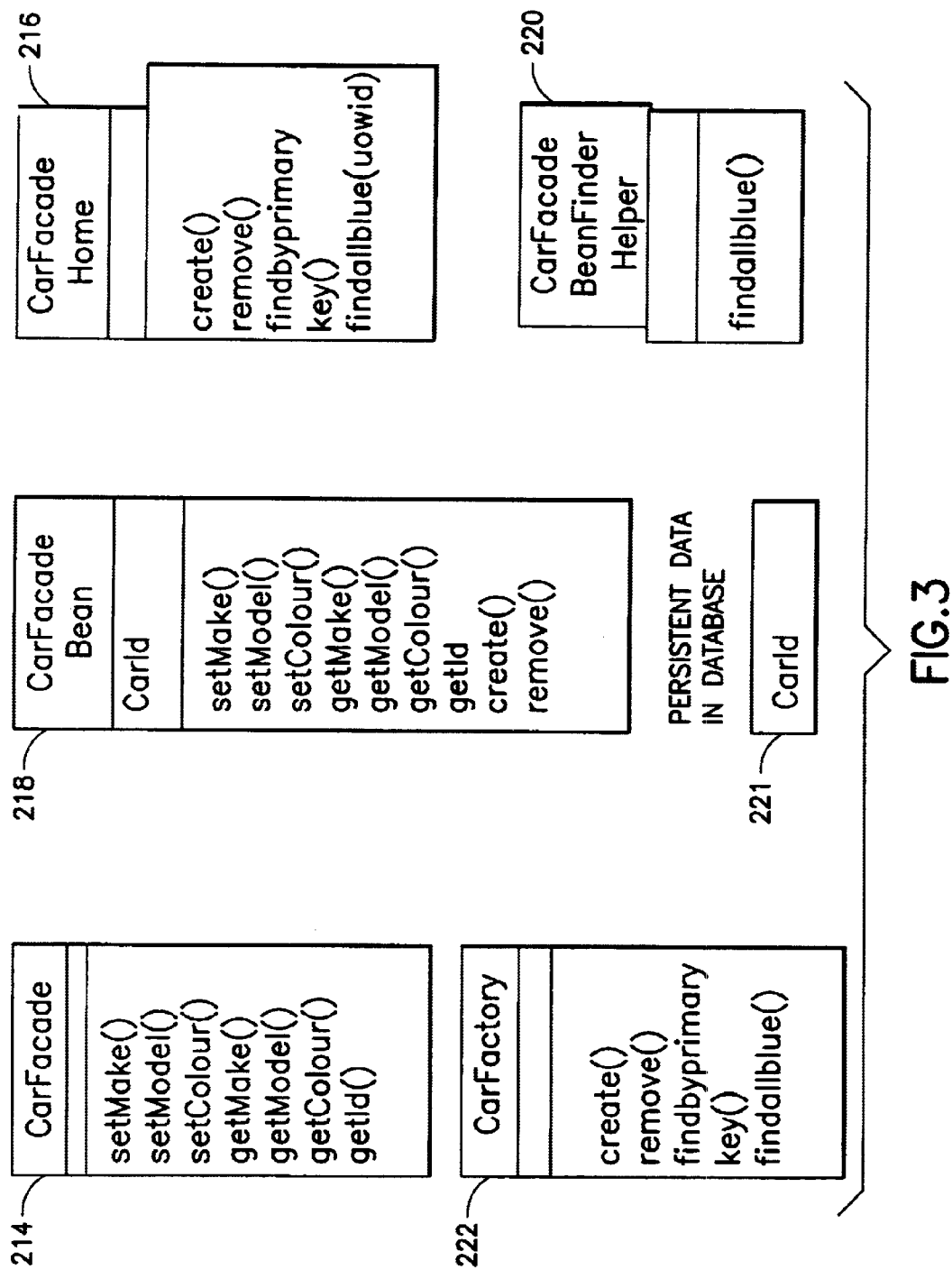
FIGS. 3 and 4 depict facade and version objects, respectively, that are generated by the Long Running Business Process framework.
Figure 4:
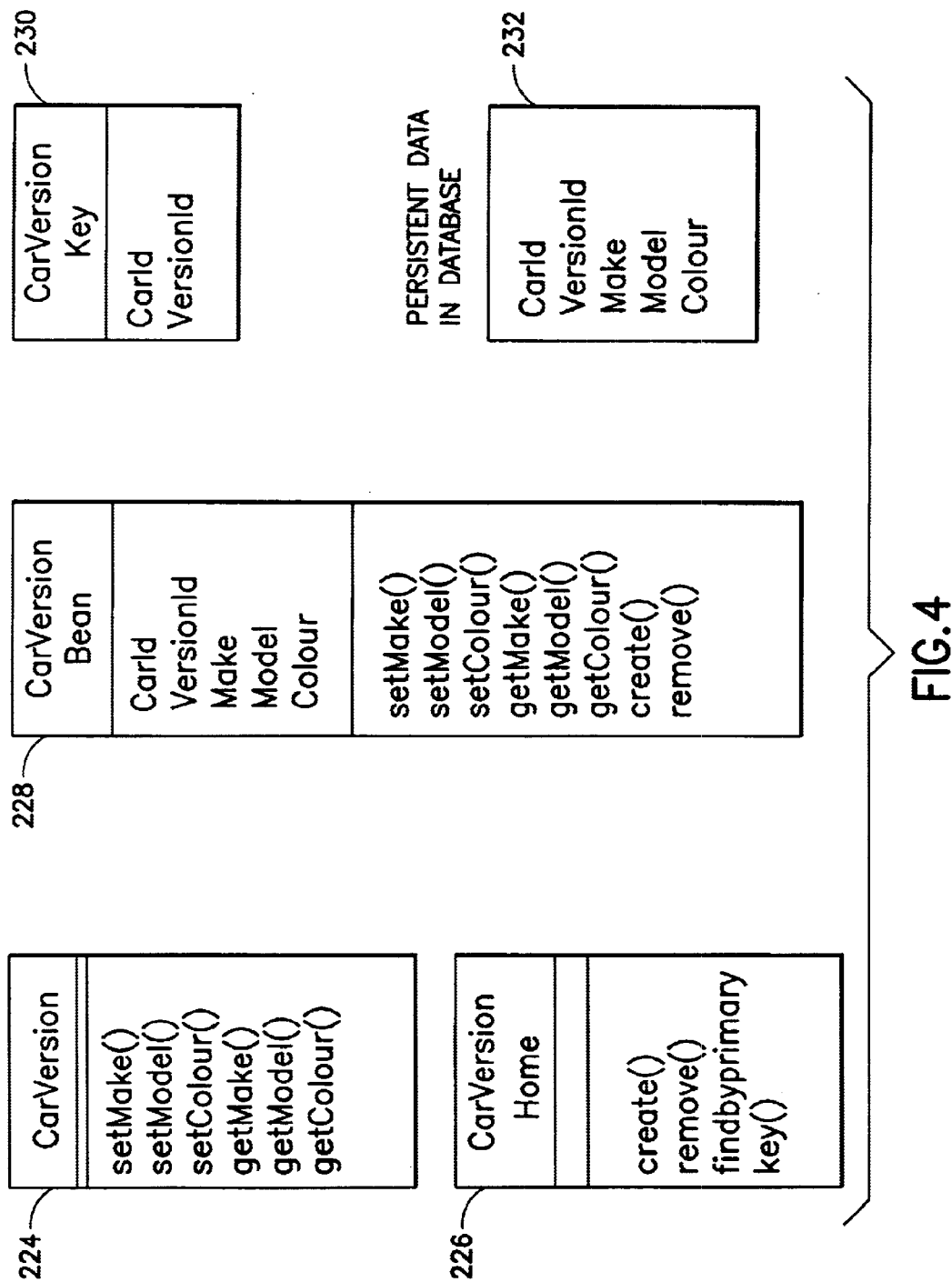

The facade and version objects generated by the Long Running Business Process framework are illustrated in FIGS. 3 and 4, respectively. The CarFacade EJB is defined by the interface classes 214 and 216, an implementation class 218 and a CarFacade Finder Helper class 220 which defines the implementation of the queries. Box 221 illustrates the persistent data of the CarFacade bean. The CarFactory 222 is the class used by the client to create, remove and find cars, rather than the CarFacade interface. The CarVersion EJB (FIG. 4) is defined by the interface classes 224 and 226, the implementation class 228, the key class 230 which contains the original key and the VersionId. Box 232 lists the persistent data fields which include the persistent data fields of the base object and the VersionId.

In one preferred embodiment the original queries defined in the CarBeanFinderHelper class 210 are expressed in SQL, and the new queries are expressed in SQL in the CarFacadeBeanFinderHelper. By way of explanation, a new SQL query is generated, in accordance with this invention, as follows.

The standard form for the original SQL query is:

SELECT * FROM EJB.xxxBeanTbl WHERE search_condition, where xxx is the name of the bean. Other equivalent forms could be handled if required. For bean xxx, and any other bean which will be versioned, and whose table (EJB.yyyBeanTbl) name appears in the search_condition, the new query string has a definition of a common table expression which defines the sub-set of the versions that a query made under the context of a unit of work whose id is parameterized by ? can see. For bean xxx the common table expression CxxxBeanTbl is defined by:

WITH CxxxBeanTbl (c1, . . . ,cm) AS
  (SELECT c1, . . . ,cm FROM EJB.VxxxBeanTbl AS x Where
  LOCATE (versionId, ?)=1
  AND (LENGTH(versionId)=(SELECT MAX(LENGTH (versionId))
  FROM EJB.VxxxBeanTbl AS y WHERE
    (x.pk1=y.pk1) AND (x.pk2=y.pk2) AND, . . . , (x.pkn=y.pkn) AND LOCATE (versionId,?)=1))), where the c1, . . . ,cm are the column names, pk1, pk2, . . . ,pkn are the names of the columns in the key of the bean xxx's database table, EJB.VxxxBeanTbl is the name of xxx's version table, and unit of work ids are strings which are made by concatenating the string identifying the parent transaction and a unique string.

The search_condition is modified by replacing any names of tables of beans which will be versioned by the name of the corresponding common table expression.

The new query string is completed by the following clause which selects from the facade table those rows which have keys identical to a row of the common table expression for bean xxx which satisfies the search_condition:

SELECT * FROM EJB.FxxxBeanTbl WHERE
  (pk1,pk2, . . . ,pkn) IN (SELECT pk1,pk2, . . . ,pkn FROM CxxxBeanTbl WHERE search_condition)

where EJB.FxxxBeanTbl is the name of the bean xxx"s facade table.

More particularly, the teachings of this invention provide steps for generating, for each specialized finder method in the base object home interface, the implementation of the corresponding method in the Factory (222), the definition of the corresponding method in the FacadeHome (216), and its implementation as defined in the FacadeBeanFinderHelper (220).

The preferred embodiments will be illustrated in the context of two cases.

In one case, that of a Websphere™ Advanced product available from the assignee of this patent application, for each findxxx method defined on the home interface the implementation is specified by means of a string constant named findxxxQueryString in the BeanFinderHelper. The string is the SQL defining the query. The parameters of the method are mapped onto the parameters as specified in the SQL. The SQL that can be used is the SQL supported by the relational data base. Such a SQL is defined in "Using the new DB2: IBM's object-relational database system", by Don Chamberlin, Morgan Kaufmann, 1996 (ISBN 1-55860-373-5), which is incorporated by reference herein.

There is a base object database table (EJB.xxxBeanTbl) with columns corresponding to a primarykey (pkcol1, . . . ,pkcoln) and columns corresponding to other persistent attributes. (pacol1, . . . ,pacolm). The Long Running Business Process framework defines a facade object database table (EJB.FxxxBeanTbl) with primarykey columns (pkcol1, . . . ,pkcoln) and a version object database table (EJB.VxxxBeanTbl) with primary key columns (pkcol1, . . . ,pkcoln) and versionid and the persistent attribute columns (pacol1, . . . ,pacolm) in order to manage the persistence of the facade and version objects. The primary key of the version object is comprised of the primary key of the base object and the versionid which is the id of the unit of work which created it.

This embodiment uses a preferred method of constructing unit of work ids. Each unit of work id is formed by concatenating a unique string to the id of its parent unit of work. This allows the visible version object for a particular unit of work and primary key to be determined by considering the set of version objects having that primary key, and a versionid which has the same beginning as the unit of work id. The visible version object having the longest versionid is selected. Thus, the set of version objects visible to a client application is defined by the following visible version sub-query:

SELECT * FROM EJB.VxxxBeanTbl AS x WHERE
  LOCATE (versionid, ?)=1
  AND (LENGTH(versionid)=(SELECT MAX(LENGTH (versionid))
  FROM EJB.VxxxBeanTbl AS y WHERE
    (x.pkcol1=y.pkcol1) AND, . . . , (x.pkcoln=y.pkcoln) AND LOCATE (versionid, ?)=1)))

where ? is a parameter representing the unit of work id and where LOCATE (S1,S2) returns the starting position of the first occurrence of s2 inside s1 . If none exists 0 is returned.

The general form of the SQL string specified in a findxxx Query String of the base object Bean Finder Helper class is:

SELECT*FROM EJB.xxxBeanTbl((AS)correlation_name) WHERE search condition, where EJB.xxxBeanTbl is the name of the relational database table containing the persistent data of the object, and where the ( ) indicate options. The EJB.xxxBeanTbl or other relational database table names may occur in the text defining the search condition.

Figure 5:
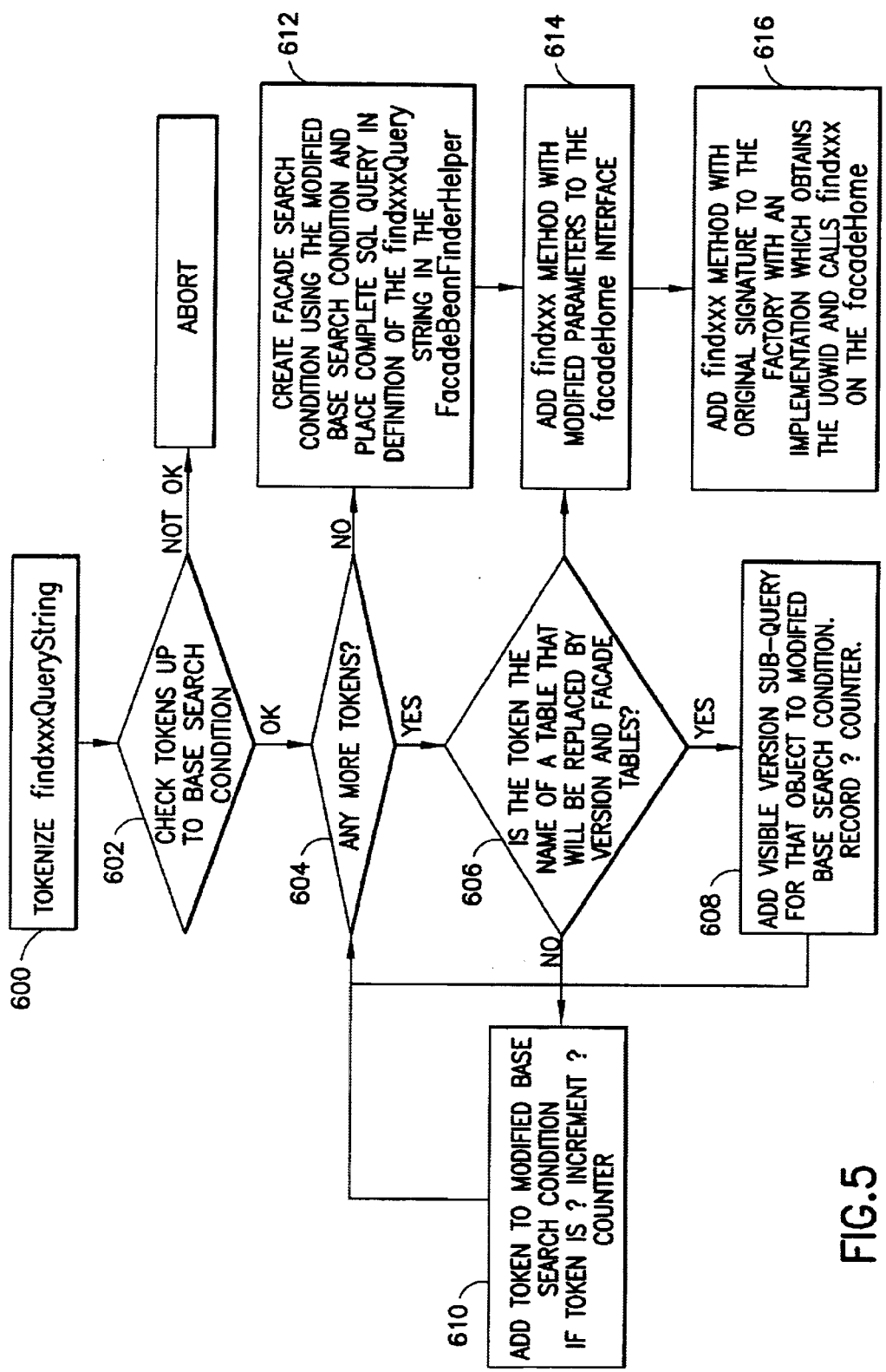
FIGS. 5 and 6 illustrate method steps for each findxxx method of a base object.

FIG. 5 is a logic flow diagram that depicts the steps used for each findxxx method of the base object. In step 600 the findxxxQuery string is tokenized, i.e., broken down into its constituent elements called tokens such as "SELECT", "*", "EJB.xxxBeanTbl", etc. In step 602, the tokenized string is verified up to the base predicate or search condition that the findxxxQueryString has the correct form and can be translated. If not, the process is aborted. Step 604 checks if there are more tokens. If there are, step 606 checks whether the token is the name of a data base table which represents an object for which facade and version objects are being defined. If it is, step 608 concatenates the appropriate visible version sub-query to the modified base search condition and records in a vector the number of ? (indicating a parameter) which have been seen. Else, at step 606, step 610 concatenates the token to the modified base search condition and increments the ? counter. Step 612 sets the findxxxQueryString in the FacadeBeanFinderHelper as:

SELECT * FROM EJB.FxxxBeanTbl WHERE facade search condition,
with the facade search condition being created as:
  (pkcol1, . . . ,pkcoln) IN
  (SELECT (pkcol1, . . . ,pkcoln) FROM
  ((visible version sub-query) ((AS) correlation_name) WHERE
  modified base search condition).

In step 614 the findxxx method with modified signature is added to the FacadeHome interface 216. The new signature begins with two units of work id parameters, then old parameters are interspersed with pairs of unit of work id parameters as indicated by the vector. In step 616 the findxxx method with the original signature is added to the ObjectFactory 222, together with an implementation that obtains the unit of work id, and then calls the findxxx method on the Facade Home interface 216.

An alternate embodiment has the findxxxQueryString created in step 612 begin with definitions such as:
  WITH CxxxBeanTbl AS (visible version sub-query),
and has the visible version sub-query replaced by its name in the facade search condition.

It is noted that those skilled in the art may derive other SQL statements that are equivalent to the SQL statement produced by the above process.

In the second case, that of the Websphere™ Enterprise product, for each findxxx method defined on the base object home interface, the implementation is specified by a method of the same name in the BeanFinderHelper. Preferably, the base object BeanFinderHelper class was generated from a standard template and only the OOSQL string was added by the programmer. If the method has parameters then this string will be a concatenation of OOSQL text and stringified parameters. Only the search condition is specified.

In the preferred embodiment for this case the visible version sub-query is generated after the ancestry vector of unit of work ids, that is, "uowid, parentuowid and grandparentuowid" etc., is known. For the case where the parent unit of work is the top level unit of work the visible version sub-query is:
  SELECT * FROM VersionHome AS x WHERE
    ((x.versionid="+uowid+").
  OR
    ((x.versionid="+parentuowid+")
    AND "+uowid+" NOT IN SELECT y.versionid
    FROM VersionHome AS y WHERE (x.primarykey=y.primarykey)"

If the grandparent is the top level unit of work then the following clause is added:
  OR
    ((x.versionid="+grandparentuowid+")
    AND ("+uowid+" NOT IN SELECT y.versionid
    FROM VersionHome AS y WHERE (x.primarykey=y.primarykey)
    AND ("+parentuowid+" NOT IN SELECT y.versionid
    FROM VersionHome AS y WHERE (x.primarykey=y.primarykey)"

As can be seen, the visible version sub-query has a distinctive pattern, wherein the visible version sub-query generation code may concatenate the predetermined clauses as required by the depth of the unit of work (uow) in the unit of work tree.

The facade search condition has the form:
  primarykey IN
    (SELECT primarykey FROM
    ((visible version sub-query) WHERE modified base search condition)

The base search condition is modified by replacing each collection name, which represents a collection of objects for which facade and version objects are being defined, with the visible version sub-query for that object.

Figure 6:
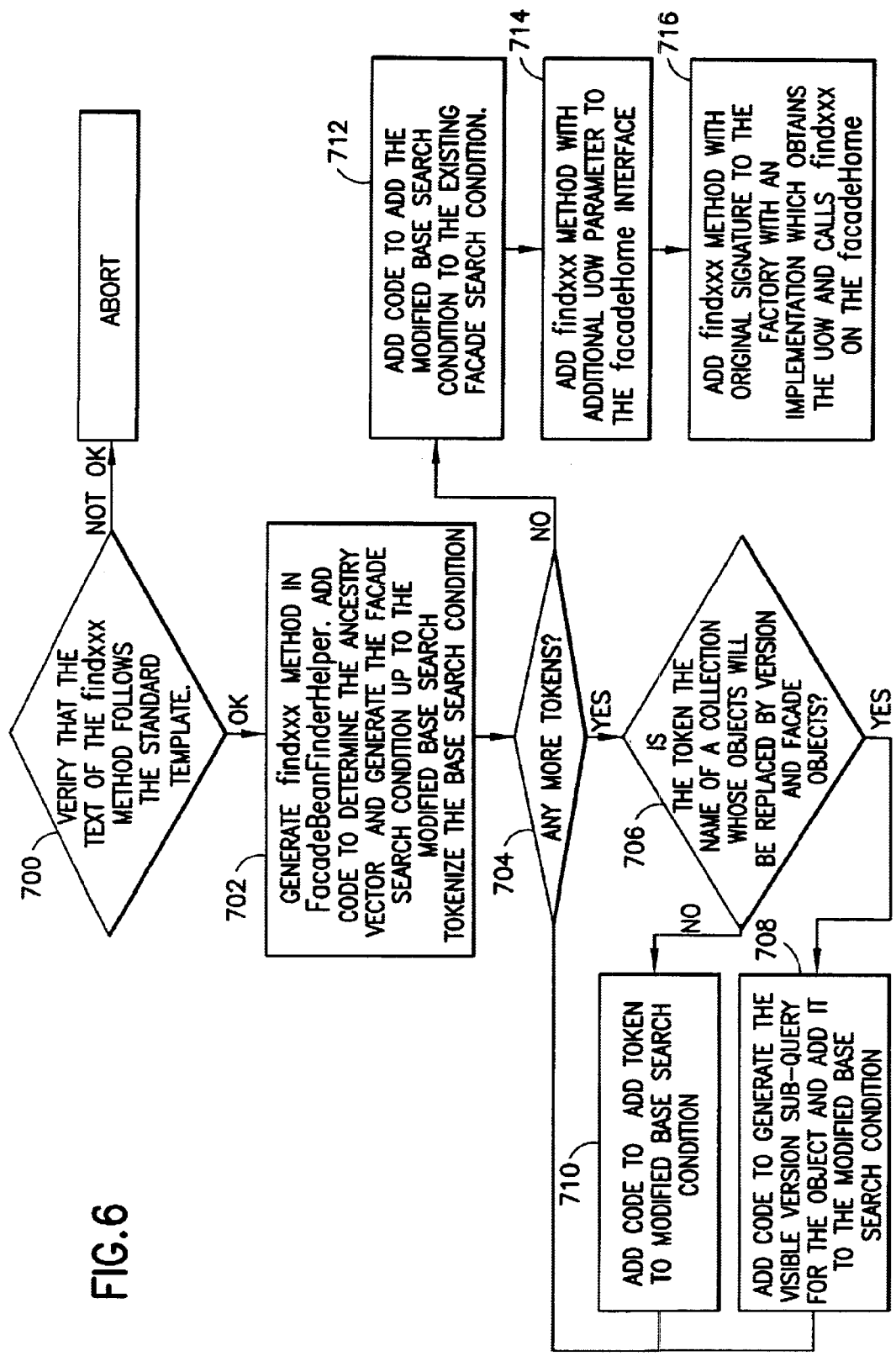

FIG. 6 is a logic flow diagram that depicts the steps used for each findxxx method of the base object. In step 700, it is verified that the findxxx method in the base object BeanFinderHelper has the standard template form. If not processing is aborted. In step 702 the findxxx method in the FacadeBeanFinderHelper 220 is generated from the standard template. Code is added to determine the ancestry vector and to generate the facade search condition up to the modified base search condition. The base search condition is then tokenized. Step 704 checks whether there are any more tokens. If there are, step 706 checks whether the token is that of a collection name that represents a collection of objects for which facade and version objects are being defined. If it is then in step 708 code is added to generate the visible version sub-query for that object and to then add it to the modified base search condition, else in step 710 code is added to add the token to the modified base search condition. When there are no more tokens, step 712 adds code to add the modified base search condition to the existing facade search condition. In step 714 the findxxx method with the additional unit of work (uow) parameter is added to the FacadeHome interface 216. In step 716 the findxxx method with the original signature is added to the ObjectFactory 222 together with an implementation which obtains the unit of work. The method then calls the findxxx method on the Facade Home interface.

In other embodiments with OOSQL the unit of work class may define a method inAncestry which returns true if a versionid is one of unit of work id (uowid), parentuowid, grandparentuowid, etc. Then the visible version sub-query may be expressed as:
  SELECT * FROM versionHome AS x WHERE
  inAncestry (versionid)
  AND versionid.length=(SELECT MAX (versionid.length)
  FROM versionHome AS y WHERE
    (x.primarykey=y.primarykey)
  AND inAncestry (versionid))

It is noted that those skilled in the art may find other OOSQL statements that are equivalent to the OOSQL statements described herein.

In a further embodiment for use in a system where the client application specifies the queries, and if SQL is used, then code to determine the uowid and execute a facade query, as described in the above first case, preferably replaces the base query execution code. Alternatively, and if only the base search condition in OOSQL is supplied, then it is replaced by code which determines the unit of work, generates a facade search condition, as described above, and then executes it.

Based on the foregoing description it can be appreciated that an aspect of this invention is a computer program embodied on a computer readable medium, such as a magnetic or optical disk, for performing a query in a Long Running Business Process framework system. The computer program includes a number of code routines or segments, including a code segment for generating a modified base search condition from a base search condition; a code segment for generating a facade search condition for specifying that a primary key be a primary key of a version object, from a visible version sub-query, that satisfies the generated modified base query; and a code segment for determining a unit of work context, and requesting all facades that satisfy the generated facade search condition.

Further in accordance with an aspect of this invention there is provided a computer program embodied on a computer readable medium that implements a method of performing a query in the Long Running Business Process framework system. The computer program is composed from computer instructions, including instructions for executing a step of determining search conditions of a query; computer instructions for executing a step of constructing the query for version objects by defining a sub-set of versions that an issuer of the query should see; computer instructions for executing a step of applying the search conditions to the defined sub-set of versions to determine unique identifications (ids) of the objects satisfying the query; and computer instructions for executing a step of using the unique ids to select the objects in a result set of the query.

While the query generator described above could be part of the client interface, in other embodiments of this invention the query generator may be a preprocessor, in which case it need not be on the client or the server, as it may be a component part of the Long Running Business Process system.

Thus, while the invention has been particularly shown and described with respect to preferred embodiments thereof, it will be understood by those skilled in the art that changes in form and details may be made therein without departing from the scope and spirit of the invention.

What is claimed is:

1. A method for performing a query in a Long Running Business Process framework system, comprising steps of:
   generating a modified base search condition from a base search condition;
   generating a facade search condition for specifying that a primary key be a primary key of a version object, from a visible version sub-query, that satisfies the generated modified base query; and
   determining a unit of work context, and requesting all facades that satisfy the generated facade search condition.

2. A method as in claim 1, where the step of generating a modified base search condition from a base search condition comprises a step of replacing names representing base objects, for which version and facade objects will be made, with a corresponding visible version sub-query.

3. A method as in claim 2, where for a class of objects, the step of replacing generates a sub-query which, for each primary key, determines a maximum length of a version id of all version object instances whose version id is that of the unit of work, or an ancestor unit of work, and a sub-query that selects the version object instances whose version id length is the maximum for that primary key.

4. A method as in claim 2, where for a class of objects the step of replacing generates a sub-query which selects versions having as a version id the unit of work id, or if none exist with that primary key, the parent unit of work id, or if neither of these exist, the grandparent unit of work id.

5. A method as in claim 2, wherein original or replacement queries are expressed in one of a Structured Query Language (SQL) or in an Object Oriented SQL (OOSQL).

6. A method as in claim 2, wherein the base objects are both persistent and containerized.

7. A method as in claim 1, and further comprising a step of verifying that one of a base findxxx method or a QueryString has an acceptable form.

8. A method as in claim 1, wherein the step of requesting all facades that satisfy the facade search condition comprises steps of generating a query that associates names to sub-queries, and using the names instead of the sub-queries in a body of the facade search condition.

9. A Long Running Business Process framework system, comprising at least one client interface coupled to servers maintaining persistent data on server databases, and comprising a query generator for generating a modified base search condition from a base search condition; for generating a facade search condition for specifying that a primary key be a primary key of a version object, from a visible version sub-query, that satisfies the generated modified base query; and for determining a unit of work context, and requesting all facades that satisfy the generated facade search condition.

10. A Long Running Business Process framework system as in claim 9, where said query generator, when generating a modified base search condition from the base search condition, replaces names representing base objects, for which version and facade objects will be made, with a corresponding visible version sub-query.

11. A Long Running Business Process framework system as in claim 10, where for a class of objects, said query generator generates a sub-query which, for each primary key, determines a maximum length of a version id of all version object instances whose version id is that of the unit of work, or an ancestor unit of work, and a sub-query that selects the version object instances whose version id length is the maximum for that primary key.

12. A Long Running Business Process framework system as in claim 10, where for a class of objects, said query generator generates a sub-query which selects versions having as a version id the unit of work id, or if none exist with that primary key, the parent unit of work id, or if neither of these exist, the grandparent unit of work id.

13. A Long Running Business Process framework system as in claim 10, wherein original or replacement queries are expressed in one of a Structured Query Language (SQL) or in an Object Oriented SQL (OOSQL).

14. A Long Running Business Process framework system as in claim 10, wherein the base objects are both persistent and containerized.

15. A Long Running Business Process framework system as in claim 9, where said query generator operates to verify that one of a base findxxx method or a QueryString has an acceptable form.

16. A Long Running Business Process framework system as in claim 9, where said query generator, as part of requesting all facades that satisfy the facade search condition, generates a query that associates names to sub-queries, and then uses the names instead of the sub-queries in a body of the facade search condition.

* * * * *